US010272512B2

(12) United States Patent
Hess et al.

(10) Patent No.: US 10,272,512 B2
(45) Date of Patent: Apr. 30, 2019

(54) PLASMA ARC CUTTING OF TUBULAR STRUCTURES

(71) Applicant: Halliburton Energy Services, Inc., Houston, TX (US)

(72) Inventors: Joseph E. Hess, Richmond, TX (US); Andrew John Cuthbert, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/107,048

(22) PCT Filed: May 23, 2014

(86) PCT No.: PCT/US2014/039422
§ 371 (c)(1),
(2) Date: Jun. 21, 2016

(87) PCT Pub. No.: WO2015/178936
PCT Pub. Date: Nov. 26, 2015

(65) Prior Publication Data
US 2016/0339535 A1  Nov. 24, 2016

(51) Int. Cl.
*B23K 10/00* (2006.01)
*B23K 37/02* (2006.01)
(Continued)

(52) U.S. Cl.
CPC .......... *B23K 10/00* (2013.01); *B23K 37/0229* (2013.01); *B23K 37/0294* (2013.01);
(Continued)

(58) Field of Classification Search
CPC ............... B23K 10/00; B23K 37/0229; B23K 37/0294; B23K 2201/06; E21B 41/00; H05H 1/26; H05H 1/34; H05H 2245/125
(Continued)

(56) References Cited

U.S. PATENT DOCUMENTS 4,238,663 A * 12/1980 Calhoun ................ B23K 7/005
219/121.36
4,492,136 A *  1/1985 Walker ................... B23D 21/04
144/34.1
(Continued)

FOREIGN PATENT DOCUMENTS

CN     201257568       6/2009
CN   201342547 Y    11/2009
(Continued)

OTHER PUBLICATIONS

"International Application Serial No. PCT/US2014/039422, International Search Report dated Feb. 2, 2015", 3 pgs.
(Continued)

*Primary Examiner* — Mark H Paschall
(74) *Attorney, Agent, or Firm* — Chamberlain Hrdlicka

(57) ABSTRACT

A method of severing a tubular structure can include producing a stream of plasma between a plasma arc cutter and the tubular structure, and displacing the plasma arc cutter relative to the tubular structure, thereby cutting through the tubular structure. A plasma arc cutting apparatus can include a transport vehicle, a boom extending from the transport vehicle, at least one plasma arc cutter, and at least one actuator that displaces the plasma arc cutter relative to the boom. Another method of severing a tubular structure can include conveying a plasma arc cutter to the tubular structure with a transport vehicle, and displacing the plasma arc cutter relative to the transport vehicle.

18 Claims, 3 Drawing Sheets

(51) Int. Cl.
    *H05H 1/44*     (2006.01)
    *E21B 41/00*     (2006.01)
    *B23K 101/06*     (2006.01)

(52) U.S. Cl.
    CPC ............... *E21B 41/00* (2013.01); *H05H 1/44* (2013.01); *B23K 2101/06* (2018.08); *H05H 2245/125* (2013.01)

(58) Field of Classification Search
    USPC .... 219/213, 121.36, 121.39, 121.44, 121.56, 219/121.48
    See application file for complete search history.

(56) References Cited

U.S. PATENT DOCUMENTS

| | | | | |
|---|---|---|---|---|
| 6,051,803 | A * | 4/2000 | Hale, Jr. | B23K 37/0276 |
| | | | | 219/121.39 |
| 6,766,751 | B2 * | 7/2004 | Liu | B65F 1/1484 |
| | | | | 110/341 |
| 9,302,353 | B2 * | 4/2016 | Brandstrom | B23K 37/0276 |
| 2002/0040889 | A1 * | 4/2002 | Markunas | H05H 1/46 |
| | | | | 219/121.36 |
| 2004/0043704 | A1 * | 3/2004 | Saberton | B23Q 1/621 |
| | | | | 451/38 |
| 2006/0102606 | A1 | 5/2006 | Twarog | |
| 2008/0302767 | A1 | 12/2008 | Yamaguchi et al. | |
| 2009/0314911 | A1 * | 12/2009 | Kamimae | E02F 9/166 |
| | | | | 248/276.1 |
| 2010/0089878 | A1 | 4/2010 | Halser | |
| 2010/0301019 | A1 * | 12/2010 | Vos | B23K 37/0258 |
| | | | | 219/121.39 |
| 2013/0186870 | A1 | 7/2013 | Phillip et al. | |
| 2016/0032904 | A1 * | 2/2016 | Kaplan | G21C 1/00 |
| | | | | 60/698 |

FOREIGN PATENT DOCUMENTS

| | | |
|---|---|---|
| CN | 203712060 | 7/2014 |
| RU | 2493356 C1 | 9/2013 |
| WO | 2014125379 A2 | 8/2014 |
| WO | WO-2015178936 A1 | 11/2015 |

OTHER PUBLICATIONS

"International Application Serial No. PCT/US2014/039422, Written Opinion dated Feb. 2, 2015", 9 pgs.

* cited by examiner

PLASMA ARC CUTTING OF TUBULAR STRUCTURES

PRIORITY APPLICATION

This application is a U.S. National Stage Filing under 35 U.S.C. 371 from International Application No. PCT/US2014/039422, filed on 23 May 2014, and published as WO 2015/178936 A1 on 26 Nov. 2015, which applications and publication are incorporated herein by reference in their entirety.

TECHNICAL FIELD

This disclosure relates generally to equipment utilized and operations performed in conjunction with cutting of tubulars and, in one example described below, more particularly provides for plasma arc cutting of tubular structures.

BACKGROUND

It can be beneficial to be able to sever a tubular quickly and conveniently. For example, in well control situations (such as, when a wellhead or equipment thereon has been damaged and/or is on fire), it can be important for health, safety and environmental reasons to be able to quickly remove damaged tubular structures and other equipment, so that the well can be brought under control. For this and other reasons, it will be appreciated that advancements in the art of cutting through tubular structures are continually needed.

DETAILED DESCRIPTION

Figure 1:
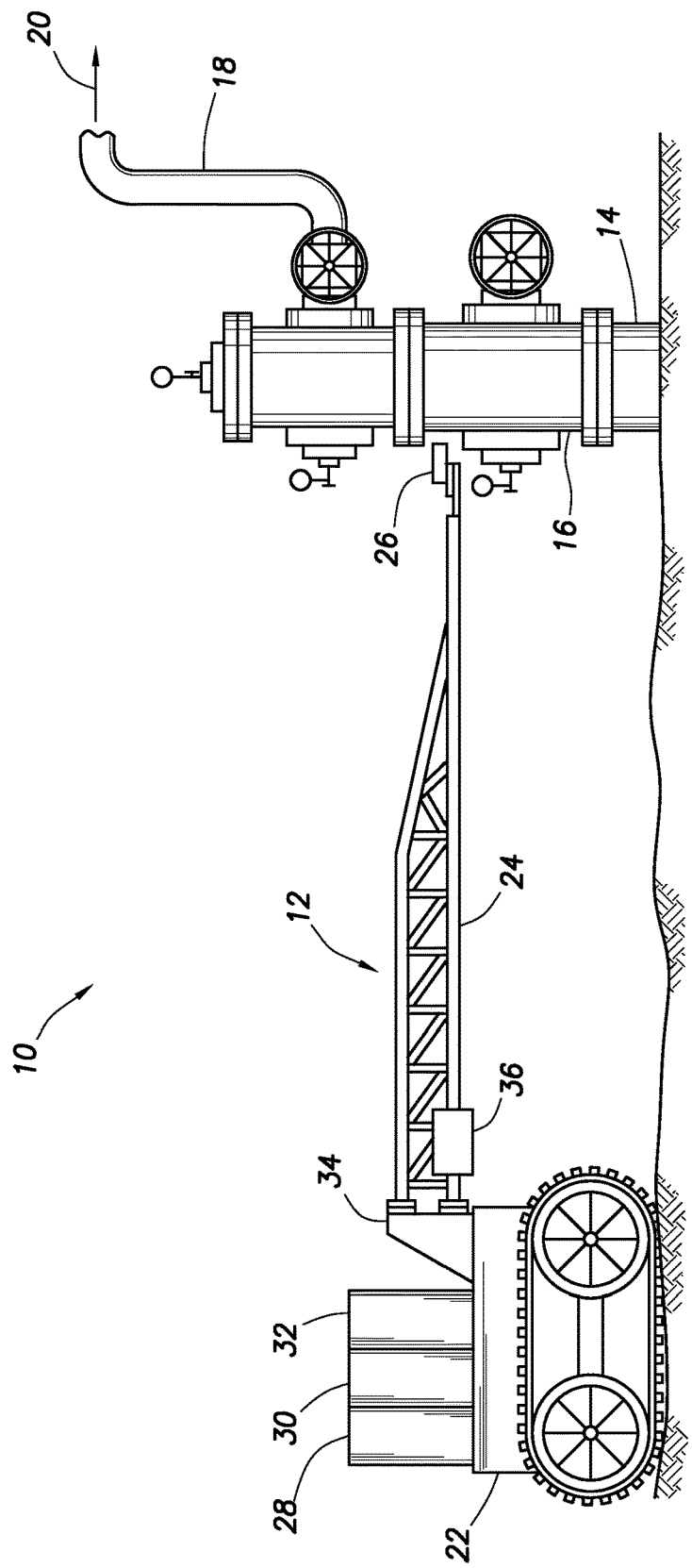
FIG. 1 is a representative elevational view of an example of a well system and associated method which can embody principles of this disclosure.

Representatively illustrated in FIG. 1 is a system 10 for use with a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the system 10, a plasma arc cutting apparatus 12 is used to sever a tubular structure at a wellsite. Examples of tubular structures that can be severed using the apparatus 12 include (but are not limited to) a well casing 14, a wellhead 16 and a hydrocarbon production conduit 18.

As used herein, the term "well casing" is used to indicate a protective wellbore lining. A conductor pipe can also be considered as a well casing. The apparatus 12 can be used to cut through casing 14 that extends above the earth's surface.

Note that hydrocarbons 20 may be flowing through the tubular structure while the apparatus 12 is being used to cut through the tubular structure. Although it would normally be considered hazardous to use an ignition source (such as, a plasma arc cutter) in close proximity to ignitable hydrocarbons 20, in some examples the hydrocarbons may already be ignited (such as, in a well control situation), or it may be desirable to ignite the hydrocarbons (for example, if the hydrocarbons include poisonous gas, such as, hydrogen sulfide).

However, it should be clearly understood that it is not necessary for hydrocarbons 20 to be present in a tubular structure in order to use the apparatus 12 to cut through the tubular structure. Instead, there may be no hydrocarbons in the tubular structure when the apparatus 12 severs the tubular structure.

If the hydrocarbons 20 are already ignited, it may be beneficial to sever a vertical portion of the tubular structure, so that water and/or other fire extinguishing substances can be flowed into the tubular structure to extinguish the hydrocarbons. The apparatus 12 example depicted in FIG. 1 is particularly suited for severing vertical tubular structures, but it is not necessary for a vertical tubular structure (or any portion thereof) to be severed in keeping with the principles of this disclosure. The apparatus 12 could be readily configured to sever horizontal or inclined tubular structures, if desired.

In the FIG. 1 example, the apparatus 12 includes a transport vehicle 22, a boom 24 extending outwardly from the transport vehicle, and multiple plasma arc cutters 26 (only one of which is visible in FIG. 1) mounted on the boom. The transport vehicle 22 is used to convey the boom 24 and plasma arc cutters 26 into close proximity to the tubular structure to be severed.

As depicted in FIG. 1, the transport vehicle 22 is a tracked vehicle for negotiating difficult terrain, but in other examples the vehicle could include individual wheels or other means of locomotion. In well control situations (for example, if the hydrocarbons 20 are ignited), a tracked vehicle can desirably operate in high temperature and debris laden environments.

In the FIG. 1 example, the transport vehicle 22 also conveys a plasma gas supply 28, a shield gas supply 30 and an electrical power supply 32 for operation of the plasma arc cutters 26. In addition, a boom manipulator 34 carried by the transport vehicle 22 is used to raise, lower, tilt, rotate and/or otherwise manipulate the boom 24, so that the plasma arc cutters 26 are appropriately positioned for cutting through a selected tubular structure.

The boom 24 depicted in FIG. 1 is used to support the plasma arc cutters 26 and to displace the plasma arc cutters relative to the tubular structure to be severed. In addition, if the hydrocarbons 20 are ignited, or will be ignited, the boom 24 desirably spaces the transport vehicle 22 away from the ignited hydrocarbons. Any length or type of boom can be used in keeping with the scope of this disclosure.

Mounted to the boom 24 in the FIG. 1 example are two actuators 36 (only one of which is visible in FIG. 1). The actuators 36 are used to displace the plasma arc cutters 26, as described more fully below. The actuators 36 can comprise electrical motors, hydraulic cylinders, linear actuators, or any other type of actuators.

In some examples, actuators 36 may not be used to displace the plasma arc cutters 26. For example, the transport vehicle 22 could be used to displace the plasma arc cutters 26 while they are cutting through a tubular structure. Any technique for displacing the plasma arc cutters 26 may be used in keeping with the scope of this disclosure.

Figure 2:
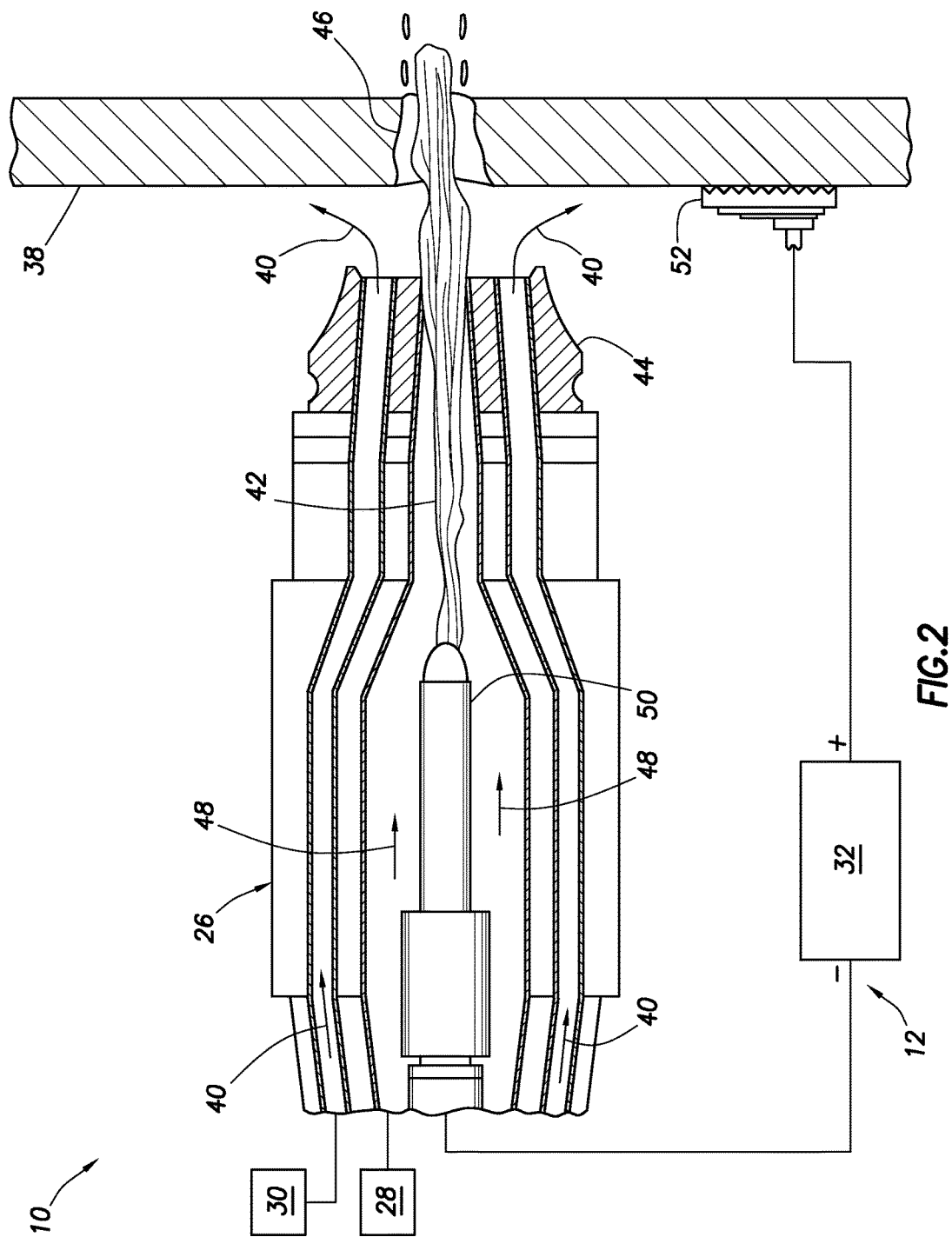
FIG. 2 is a representative cross-sectional view of a plasma arc cutter cutting through a tubular structure of the well system.

FIG. 2 is a representative cross-sectional view of an example of a plasma arc cutter 26 cutting through a tubular structure 38 of the well system 10. Of course, the plasma arc cutter 26 can be used to cut through tubular structures in other well systems, in keeping with the scope of this disclosure.

In the FIG. 2 example, the plasma arc cutter 26 is of the type that uses a separate shield gas 40 to constrict a stream of plasma 42 extending between a tip 44 of the cutter and an object being cut (the tubular structure 38, in this case). The shield gas 40 can also mitigate exposure of the plasma 42 and a melted region 46 of the object to atmosphere.

Any suitable shield gas can be used with the plasma arc cutter 26. Examples include (but are not limited to) nitrogen, compressed air and oxygen. In some cases, a shielding other than a gas (such as water) may be used. Thus, the scope of this disclosure is not limited to use of any particular type of shielding and, in some examples, no shielding at all may be used.

A cutting or plasma gas 48 flows through the plasma arc cutter 26 about a central electrode 50. An electric arc formed between the electrode 50 and the tubular structure 38 imparts energy to the gas 48, resulting in the plasma 42.

Any suitable plasma gas can be used with the plasma arc cutter 26. Examples include (but are not limited to) oxygen, nitrogen, air and argon. In some cases, the plasma gas 48 and the shield gas 40 may be the same, but delivered to the plasma arc cutter 26 at different pressures, flow rates, etc. Thus, the scope of this disclosure is not limited to use of any particular type of plasma gas.

The electrical power supply 32 is used to generate the electric arc between the electrode 50 and the tubular structure 38, and to maintain the plasma 42 state of the plasma gas 48 between the electrode and the tubular structure. The power supply 32 may supply direct current, so that the tubular structure 38 is positively charged relative to the electrode 50.

A circuit (not shown) can be provided to initiate an arc (known to those skilled in the art as a pilot arc), for example, between the tip 44 and the tubular structure 38, in order to then initiate the arc between the electrode 50 and the tubular structure. However, it should be understood that the scope of this disclosure is not limited to any particular technique for initiating the arc between the electrode 50 and the tubular structure 38, or to any particular technique (or type of electrical power supply, etc.) for maintaining the stream of plasma 42.

An electrode 52 can be attached to or otherwise electrically connected to the tubular structure 38. For example, the electrode 52 could be clamped to the tubular structure 38. In well control situations (for example, if the hydrocarbons 20 are ignited or to be ignited), it may be impractical or hazardous to rigidly secure the electrode 52 to the tubular structure 38, in which case the electrode can be made to contact the tubular structure without securing the electrode to the tubular structure, as described more fully below.

Figure 3:
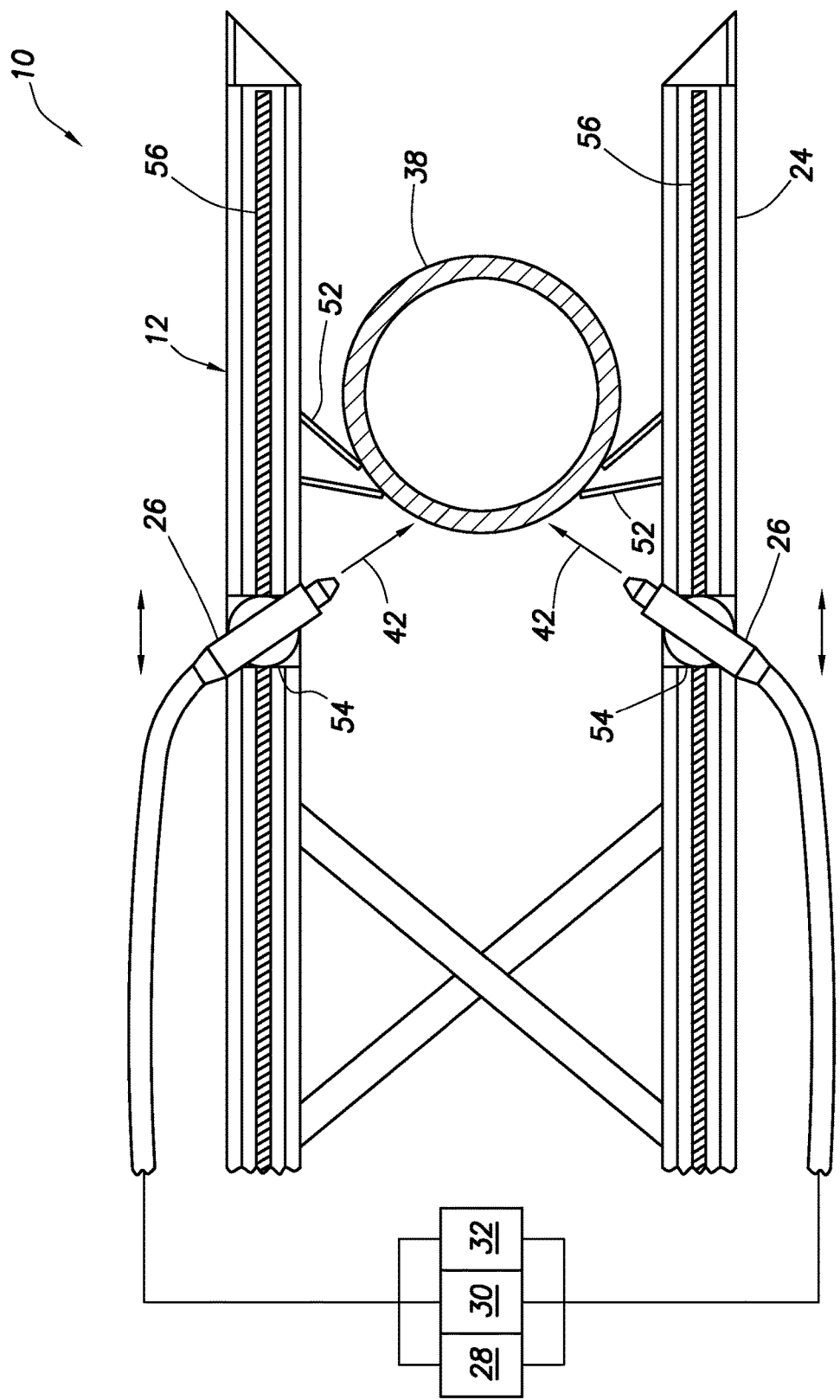
FIG. 3 is a representative plan view of an example of plasma arc cutters mounted on a boom of a transport vehicle.

FIG. 3 is a representative plan view of one example of the plasma arc cutters 26 mounted on the boom 24 of the transport vehicle 22 (see FIG. 1). In this view it may be seen that the streams of plasma 42 from the plasma arc cutters 26 are directed inward toward the tubular structure 38 positioned between laterally spaced apart arms of the boom 24.

The plasma arc cutters 26 are mounted on carriages 54 that are displaceable longitudinally along the arms of the boom 24. The plasma gas, shield gas and electrical power supplies 28, 30, 32 are connected to the plasma arc cutters 26.

In this example, threaded rods 56 are received in the arms of the boom 24. The threaded rods 56 are rotated by the actuators 36 (see FIG. 1), thereby causing the carriages 54 and plasma arc cutters 26 mounted thereon to displace relative to the tubular structure 38.

In other examples, additional or different types of actuators may be used to displace the plasma arc cutters 26 in various directions. The plasma arc cutters 26 could, for example, be displaced in arcs about the tubular structure 38. Suitable actuators could be mounted on the carriages 54 in some examples.

Thus, the scope of this disclosure is not limited to any particular manner of displacing the plasma arc cutters 26 relative to the tubular structure 38. Although two plasma arc cutters 26 are depicted in the FIG. 3 example, any number (including one) of the plasma arc cutters may be used.

FIG. 3 depicts another example of the electrode 52. In this example, multiple flexible electrodes 52 are mounted on the arms of the boom 24 so that, when the tubular structure 38 is positioned appropriately between the arms, the electrodes will electrically contact the tubular structure. In other examples, the boom 24 arms themselves may serve as the electrodes 52 by electrically contacting the tubular structure 38. Any number and any type of electrodes 52 may be used in keeping with the scope of this disclosure.

It may now be fully appreciated that the above disclosure provides significant advancements to the art of severing tubular structures. The plasma arc cutting apparatus 12 described above can be used for quickly and conveniently cutting through tubular structures at wellsites when time is of the essence. Of course, the apparatus 12 can be useful in a variety of other situations and locations, as well.

The above disclosure provides to the art a method of severing a tubular structure 38. In one example, the method can comprise producing a stream of plasma 42 between a plasma arc cutter 26 and the tubular structure 38, and displacing the plasma arc cutter 26 relative to the tubular structure 38, thereby cutting through the tubular structure 38.

The displacing step can include displacing the plasma arc cutter 26 while the tubular structure 38 remains stationary. The displacing step may include displacing the plasma arc cutter 26 relative to a boom 24 extending from a transport vehicle 22.

The tubular structure 38 may be selected from the group consisting of a well casing 14, a wellhead 16 and a hydrocarbon production conduit 18. Any type of tubular structure can be severed using the method. The tubular structure 38 may be vertical during the cutting step.

Ignited hydrocarbons 20 may flow through the tubular structure 38 during the cutting step. The cutting step can include igniting hydrocarbons 20 in the tubular structure 38.

The above disclosure also provides to the art a plasma arc cutting apparatus 12. In one example, the apparatus 12 can include a transport vehicle 22, a boom 24 extending from the transport vehicle 22, at least one plasma arc cutter 26, and at least one actuator 36 that displaces the plasma arc cutter 26 relative to the boom 24.

The "at least one" plasma arc cutter 26 may comprise multiple plasma arc cutters 26. Plasmas 42 can emanate from the plasma arc cutters 26 to a same structure 38.

The actuator 36 may displace the plasma arc cutter 26 longitudinally relative to the boom 24.

The transport vehicle 22 can convey a plasma gas supply 28, an electrical power supply 32 and/or a shield gas supply 30.

The apparatus 12 may include an electrode 52 extending from the boom 24.

Another method described above for severing a tubular structure 38 can comprise conveying a plasma arc cutter 26 to the tubular structure 38 with a transport vehicle 22, and displacing the plasma arc cutter 26 relative to the transport vehicle 22.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of severing a tubular structure, the method comprising:
    positioning the tubular structure between two arms of a boom extending from a motorized transport vehicle, each arm comprising a plasma arc cutter coupled to the arm and oriented towards the opposite arm;
    producing two streams of plasma, each stream of plasma produced between one of the two plasma arc cutters and the tubular structure; and
    displacing the plasma arc cutters relative to the tubular structure by displacing the plasma arc cutters relative to the boom, thereby cutting through the tubular structure.
2. The method of claim 1, wherein the displacing further comprises displacing the plasma arc cutters while the tubular structure remains stationary.
3. The method of claim 1, wherein the tubular structure is selected from the group consisting of a well casing, a wellhead and a hydrocarbon production conduit.
4. The method of claim 1, wherein the tubular structure is vertical during the cutting.
5. The method of claim 1, wherein the cutting comprises cutting the tubular structure with hydrocarbons flowing through the tubular structure such that the cutting ignites the hydrocarbons.
6. The method of claim 1, further comprising displacing an electrode extending from the boom with respect to the motorized transport vehicle to directly contact the tubular structure.
7. A plasma arc cutting apparatus for cutting a tubular structure, comprising:
    a motorized transport vehicle;
    a boom extending from the motorized transport vehicle, the boom comprising two arms configured to allow the tubular structure to be positioned between the two arms;
    two plasma arc cutters, each plasma arc cutter coupled to a different arm of the boom and oriented towards the opposite arm; and
    two actuators, each actuator displacing one of the two plasma arc cutters relative to the boom.
8. The apparatus of claim 7, wherein plasmas emanate from the plasma arc cutters to a same structure.
9. The apparatus of claim 7, wherein the actuators displace the plasma arc cutters along a longest side of the boom.
10. The apparatus of claim 7, wherein the motorized transport vehicle conveys a plasma gas supply and an electrical power supply.
11. The apparatus of claim 10, wherein the motorized transport vehicle further conveys a shield gas supply.
12. The apparatus of claim 7, further comprising an electrode extending from the boom and movable with respect to the motorized transport vehicle to directly contact a tubular structure.
13. A method of severing a tubular structure, the method comprising:
    conveying two plasma arc cutters to the tubular structure with a motorized transport vehicle, each plasma arc cutter coupled to a different arm of two arms of a boom extending from the motorized transport vehicle and oriented towards the opposite arm;
    positioning the tubular structure between the two arms of the boom; and
    displacing the plasma arc cutters relative to the boom to cut through the tubular structure.
14. The method of claim 13, further comprising producing two streams of plasma, each stream of plasma produced between one of the two the plasma arc cutters and the tubular structure.
15. The method of claim 13, wherein the displacing further comprises displacing the plasma arc cutters relative to the tubular structure.
16. The method of claim 13, wherein the displacing further comprises displacing the plasma arc cutters while the tubular structure remains stationary.
17. The method of claim 13, wherein the tubular structure is selected from the group consisting of a well casing, a wellhead and a hydrocarbon production conduit.
18. The method of claim 13, further comprising cutting the tubular structure with the plasma arc cutters with hydrocarbons flowing through the tubular structure, thereby igniting the hydrocarbons.

* * * * *